(12) United States Patent
Tang et al.

(10) Patent No.: US 7,054,944 B2
(45) Date of Patent: May 30, 2006

(54) ACCESS CONTROL MANAGEMENT SYSTEM UTILIZING NETWORK AND APPLICATION LAYER ACCESS CONTROL LISTS

(75) Inventors: Puqi Tang, Portland, OR (US);
Timothy Diep, Portsmouth, NH (US);
Wayne Hlasnik, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 682 days.

(21) Appl. No.: 10/029,708

(22) Filed: Dec. 19, 2001

(65) Prior Publication Data

US 2003/0115344 A1 Jun. 19, 2003

(51) Int. Cl.
*G06F 15/16* (2006.01)

(52) U.S. Cl. ............... 709/229; 713/152; 709/223
(58) Field of Classification Search ............. 709/229; 713/201
See application file for complete search history.

(56) References Cited

U.S. PATENT DOCUMENTS

| 5,793,763 | A | | 8/1998 | Mayes et al. |
| 5,812,819 | A | * | 9/1998 | Rodwin et al. ............ 703/23 |
| 5,941,947 | A | | 8/1999 | Brown et al. |
| 6,058,431 | A | * | 5/2000 | Srisuresh et al. ......... 709/245 |
| 6,161,139 | A | * | 12/2000 | Win et al. ................ 709/225 |
| 6,219,706 | B1 | * | 4/2001 | Fan et al. ................. 709/225 |
| 6,219,786 | B1 | * | 4/2001 | Cunningham et al. ...... 713/152 |
| 6,249,873 | B1 | | 6/2001 | Richard et al. |
| 6,557,037 | B1 | | 4/2003 | Provino |
| 6,651,096 | B1 | * | 11/2003 | Gai et al. ................. 709/223 |

FOREIGN PATENT DOCUMENTS

DE 199 24 575 12/1999

OTHER PUBLICATIONS

Tari, Z.; "A role-based access control for intranet security" Sep./Oct. 1997; Internet Computing, IEEE, vol. 1, Iss. 5; pp. 24-34.*

Barkley, John; "Comparing simple role based access control models and access control lists" 1997; ACM Workshop on Role Based Access Control; Proceedings of the second ACM workshop on Role-based access control; Fairfax, Virginia; pp. 127-132.*

(Continued)

*Primary Examiner*—William C. Vaughn, Jr.
(74) *Attorney, Agent, or Firm*—Fish & Richardson P.C.

(57) ABSTRACT

A method of access control management includes determining a private network address for a user in connection with the user accessing a network resource, determining an access control list entry for the user based on an access control policy, translating a public network address to the private network address for the user accessing the network resource, and allowing or blocking the user access based on the access control list entry, wherein determining the access control list entry is performed before translating the public network address to the private network address.

18 Claims, 2 Drawing Sheets

OTHER PUBLICATIONS

Hayden, Matt; "Teach Yourself Networking in 24 Hours" 1998; Sams Publishing; First Edition; pp. 97-98, 231-232.*

Russell, Deborah; "Computer Security Basics" 1991; O'Reilly & Associates, Inc.; First Edition; pp. 70-72.*

Egevang, K.; "RFC 1631—The IP Network Address Translator (NAT)" May 1994.*

Sandhu, R.S.; "Access control: principle and practice" Sep. 1994; Communications Magazine, IEEE, vol. 32, Iss. 9; pp. 40-48.*

Droms, R.; "RFC 2131—Dynamic Host Configuration Protocol" Mar. 1997.*

* cited by examiner

ACCESS CONTROL MANAGEMENT SYSTEM UTILIZING NETWORK AND APPLICATION LAYER ACCESS CONTROL LISTS

TECHNICAL FIELD

This invention relates to access control.

BACKGROUND

The Internet, which allows users to access the resources of interconnected computers, also offers the possibility of access to smaller, private networks (intranets). Intranets typically include systems that restrict access to the networked resources of the intranet to only authorized users. Networked resources refers to the hardware, software, and data included in a network and accessible to authorized users from inside or outside the network.

DESCRIPTION

Figure 1:
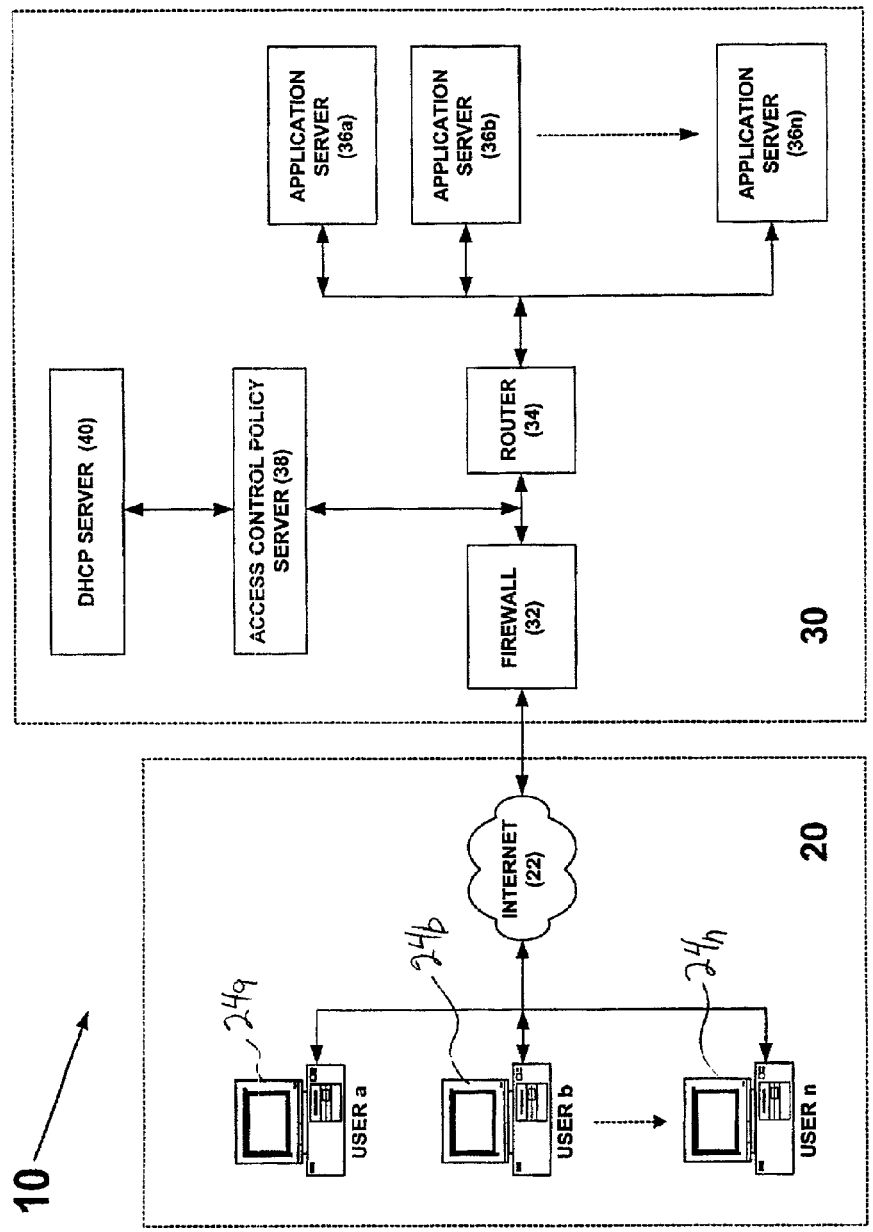
FIG. 1 is a block diagram.

Referring to FIG. 1, a computer network 10 includes a public network 20, in this case the Internet 22, connected to a private network 30. External computer USERa-USERn ("users") may access the resources of the Internet 22 through computers 24a–24n. Users may also attempt to access resources of private network 30 by sending access requests through Internet 22 to private network 30. Private network 30 determines whether to allow or block each user access request.

Private network 30 includes an access control policy server 38 that manages an access policy for private network 30. The various computers and devices included in private network 30 use access control lists (ACLs) to determine and control access to the resources of private network 30. The ACLs used by the computers and devices included in network 30 are maintained and generated by policy server 38, as will be explained.

In addition to policy server 38, private network 30 includes other inter-connected computer systems, i.e., a Dynamic Host Configuration Protocol (DHCP) server 40 that dynamically allocates a private IP address for each user of private network 30, and a firewall computer 32 that authenticates user requests received from public network 20 and translates a public IP address for each user request to the dynamically allocated private IP address from DHCP server 40. Firewall computer 32 also forwards authenticated user requests, along with the translated private IP address, to a router 34 that transports data within private network 30. Private network 30 also includes application server computers 36a–36n that provide application programs and data to authorized users.

Computer systems 32, 34, 36a–36n, 38 and 40, interpret data packets based on one or more functional layers of an Open Systems Interconnect (OSI) model. For example, router 34 interprets packets using the network layer of OSI, and therefore, uses a network layer ACL from policy server 38 to determine which packets are to be blocked or transmitted to a server 36a–36n.

Policy server 38 maintains the access control policy by storing application layer ACLs for server computers 36a–36n. The application layer ACLs used by server computers 36a–36n are specific to each server or specific to an application on each server. Application layer ACLs do not include the dynamically allocated private IP address from DHCP server 40, however, a network layer ACL may use the private IP address as part of a network layer ACL entry.

Whenever a private IP address is allocated from DHCP server 40 (i.e., a private IP address is assigned to a new access request), policy server 38 retrieves the appropriate application layer ACL for the access request and generates a corresponding network layer ACL. Policy server 38 then sends the generated network layer ACL to each network device, such as router 34, and also to each application server 36a–36n that supports network layer packet filtering. Policy server 38 also sends the retrieved application layer ACL to those servers 36a–36n that do not support network layer packet filtering. As each ACL is received by a network device or computer system in private network 30, the ACL is "installed" by that device or computer system, and then used to determine whether to allow or deny access to a received user access request, as will be explained. Please note that the ACL retrieval, generation and installation is performed before the allocated private IP address is sent to firewall computer 32.

Maintaining the control policy on a centralized policy server 38 avoids having to manage separate access policies (and separate ACLs) on each server computer and network device in private network 30. This also assures the horizontal consistency of ACLs that are used in each application layer throughout private network 30. Furthermore, the access control policy server 38 uses the private IP address allocated at "runtime" to dynamically generate network layer ACLs that map to application layer ACLs, both of which are then distributed to the appropriate systems in private network 30. This assures vertical consistency of ACLs logically across application layers and network layers.

Figure 2:
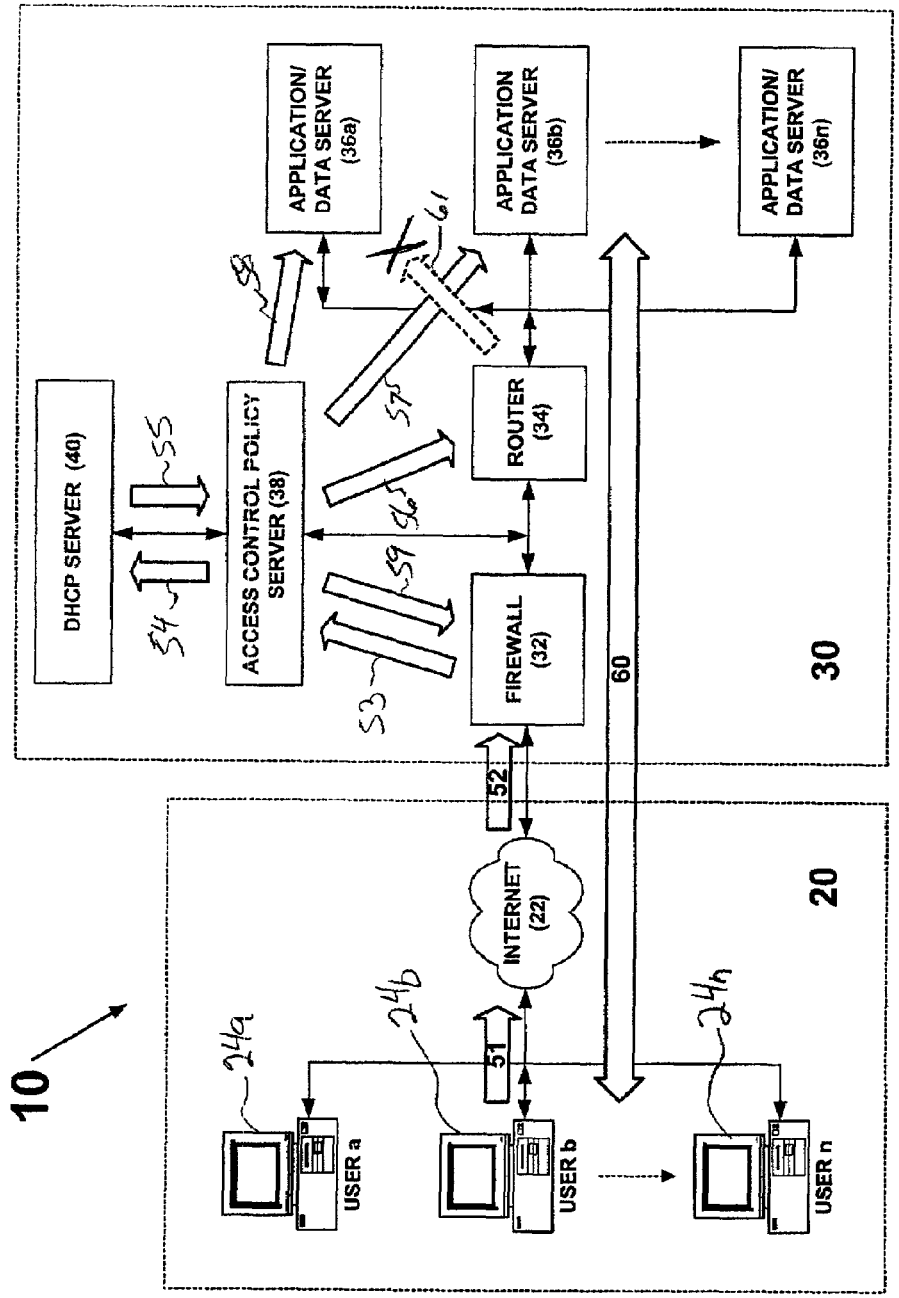
FIG. 2 shows data and command flows in the block diagram of FIG. 1.

An example of a user 24b attempting to access an application from server 36a and 36b is shown in FIG. 2. Flow arrows (51–59) depict the sequence of actions required to establish a flow of data (60) for a user 24b attempting to access an application from server 36b. In this example, user 24b is allowed access to an application on server 36b, but denied access to any applications on server 36a. User 24b sends (51) a login message through Internet 22. The login message is forwarded (52) through Internet 22 to firewall computer 32. Firewall computer 32 authenticates the credentials included in the login message, and sends (53) a DHCP request to policy server 38. Policy server 38 forwards (54) the DHCP request to DHCP server 40. In response to the DHCP request, DHCP server 40 returns (55) a private IP address to policy server 38. Policy server 38 searches the application ACLs stored in access control database and finds an entry that corresponds to "user 24b is allowed to read from application server 36b, but not allowed to access other servers". Policy server 38 uses the private IP address to generate a network layer ACL entry (required by each network layer device, such as router 34) that corresponds to the found application layer ACL. Policy server retrieves the found application layer ACL for each of the server computers 36a–36n. Then policy server 38 sends (56) the generated network layer ACLs to router 34, and sends (57)(58) the retrieved application layer ACLs to servers 36a and 36b, respectively. Router 34, and servers 36a and 36b, install, respectively, the received ACLs, for use in determining access for the user access request.

Before the installation of ACL entries in router 34 and servers 36a and 36b, policy server 38 may query the individual server computers 36a and 36b to determine their packet filtering capabilities. If policy server 38 determines that a server computer is capable of performing network layer packet filtering, policy server 38 may also send the generated network ACL entry to that server.

Continuing with the example shown in FIG. 2, policy server 38 returns (59) the private IP address for user 24b to firewall computer 32. At this point firewall computer 32 performs the required network address translation (NAT) for user 24b (i.e., translating a public IP address associated with the user on public network 20 to the allocated private IP address). Performing NAT allows a flow of data (60) to be established between user computer 24b and application server 36b. However, when user 24b attempts (61) to access server 36a, for example, the network layer ACL installed at router 34 or the application layer ACL installed at server 36a, will block the access request.

Please note that before firewall computer 32 translates ("tags") the user access request with the private IP address (via NAT), the access control ACLs, for both application layer computers and network layer devices have already been sent by policy server 38, and installed by the respective computers and network devices of private network 30.

Access control policy may be stored on a storage medium (not shown) connected to policy server 38. The access control policy may be modified by an authorized manager via a direct connection to policy server 38 (not shown) and may be modified indirectly by commands received at policy server 38 from an authorized manager associated with one of the server computers 36a–36n.

The access control policy uses "role-based" definitions to determine what level of access is allowed for a user request based on a defined role for each user. For example, access control policy may include several different roles, such as a "guest" who is denied access to any server data, a "regular user" who is allowed to read data from a specific server, a "power user" who is allowed to modify data on a specific server, and an "administrator" who is allowed to modify data on a specific server and allowed to re-boot that server.

Each entry in a network layer ACL (shown below), generated by policy server 38, includes a "5-tuple", i.e., a five (5) field filter along with a "deny" or "allow" action associated with that 5-tuple.

NETWORK LAYER ACL ENTRY:
(SIP, DIP, Proto, SPort, DPort) -> Action

The first field, SIP, stands for the source IP address (in this case the private IP address of the user in the private network 30). The second field, DIP, stands for the destination IP address of a server 36a–36n in the private network. The third field, Proto, stands for a transport layer protocol, such as TCP, UDD, etc. for which this ACL is intended. The fourth field, SPort, stands for the source port of the user request. The fifth field, DPort, stands for the destination port of the server application.

Exemplary network layer ACL entries, Entry A and Entry B, generated by policy server 38 are shown below.
ACL Entry A: (192.168.3.10, IpAddrOfAppServer36b, TCP, SPort, PortOnAppServer36b) -> "ALLOW";
ACL Entry B: (192.168.3.10, *, *, SPort, *) -> DENY.

ACL Entry A and ACL Entry B correspond to network layer ACL entries that are mapped and generated by policy server 38 for the previous example shown in FIG. 2. In more detail, ACL Entry A is generated to ALLOW access for user requests from source IP address "192.163.3.10" (the private IP address allocated to user 24b by DHCP server 40). ACL Entry A also specifies a destination port of server computer 36b, a TCP protocol designation (the network layer of OSI), a source port corresponding to firewall computer 32 and a destination port corresponding to an application on server computer 36b. ACL Entry B would also be generated along with ACL Entry A. ACL Entry B is generated to DENY access to all user 24b requests to any other server besides server 36b. The '*' character included in ACL Entry B is a wildcard character, and is interpreted as all values allowed by the field in which the wildcard is used. In ACL Entry B, therefore, all user requests from source address "192.163.3.10" and from the source address of firewall computer 32 are denied access to any server system in private network 30.

When a user has finished with an established data flow to a server computer, for example, firewall computer 32 releases the private IP address allocated to that data flow and also de-installs the network layer ACLs. In more detail, firewall computer 32 sends a DHCP release request to policy server 38, and policy server 38 de-installs the network ACL entries associated with the private IP address from all "enforcement points", such as router 34 (and server 36b, if server 36b is capable of network layer filtering). In an embodiment, policy server 38 includes a cache (not shown) for storing each network layer ACL. Therefore, in this embodiment, policy server 38 deletes the appropriate network ACL entries from its cache and forwards the DHCP release request to the DHCP server 40. DHCP server 40 responds to policy server 38 with a release acknowledgement, and policy server 38 forwards the release acknowledgement to firewall computer 32.

The process of generating ACLs according to a centralized access control policy, hereafter referred to as "process 100", is not limited to use with the hardware and software of FIG. 1. It may find applicability in any computing or processing environment. Process 100 may be implemented in hardware, software, or a combination of the two. Process 100 may be implemented in computer programs executing on programmable computers or other machines that each include a processor and a storage medium readable by the processor The invention is not limited to the specific embodiments described above. For example, control policy server 38 and DHCP server 40 may be implemented on a single computer system performing both the allocation of private IP addresses and the generation of ACL's according to the control policy of system Other embodiments not described herein are also within the scope of the following claims.

What is claimed is:

1. A method comprising:
   determining a private network address for a user in connection with the user accessing a network resource on a network;
   determining an application layer access control list entry for the user based on an access control policy;
   generating a network layer access control list entry for the user based on the determined private network address;
   sending the determined application layer access control list entry to nodes on the network that do not support network layer packet filtering;
   sending the generated network layer access control list entry to nodes on the network that support network layer packet filtering;
   translating a public network address to the private network address for the user accessing the network resource; and allowing or blocking the user access to the network resource based on at least one of the application layer access control list entry and the network layer access control list entry.

2. The method of claim 1, wherein the generated network layer access control list entry comprises at least one of a destination address, a protocol layer designation, a source port, a destination port, the determined private network address, and an indication of allowed or denied access to the network resource.

3. The method of claim 1, wherein determining the private network address comprises allocating a network address based on a dynamic host configuration protocol (DHCP).

4. The method of claim 1, wherein determining an application layer access control list entry further comprises retrieving an application layer access control list entry stored in a database, and
wherein a server computer on the network that does not support network layer packet filtering uses an application layer protocol based on an open system interconnection (OSI) model.

5. The method of claim 1, further comprising storing the access control policy on a storage medium connected to a first computer in the network, the access control policy including defined roles for each user allowed to access a resource in the network.

6. The method of claim 1, further comprising:
releasing the private network address following completion of the access to the network resource.

7. The method of claim 6, further comprising:
de-installing the network layer access control entry following completion of the access to the network resource.

8. An article comprising a machine-readable medium that stores machine-executable instructions, the instructions causing a machine to:
determine a private network address for a user in connection with the user accessing a network resource on a network;
determine an application layer access control list entry for the user based on an access control policy;
generate a network layer access control list entry for the user based on the determined private network address;
send the determined application layer access control list entry to nodes on the network that do not support network layer packet filtering;
send the generated network layer access control list entry to nodes on the network that support network layer packet filtering;
translate a public network address to the private network address for the user accessing the network resource; and
allow or block the user access to the network resource based on at least one of the application layer access control list entry and the network control access list entry.

9. The article of claim 8, wherein the generated network layer access control list entry comprises at least one of a destination address, a protocol layer designation, a source port, a destination port, the determined private network address, and an indication of allowed or denied access to the network resource.

10. The article of claim 8, wherein determining the private network address comprises allocating a network address based on a dynamic host configuration protocol (DHCP).

11. The article of claim 8, wherein determining an application layer access control list entry further comprises retrieving an application layer access control list entry stored in a database, and
wherein a server computer on the network that does not support network layer packet filtering uses an application layer protocol based on an open system interconnection (OSI) model.

12. The article of claim 8, further comprising storing the access control policy on a storage medium connected to a first computer in the network, the access control policy including defined roles for each user allowed to access a resource in the network.

13. The article of claim 8, further comprising:
releasing the private network address following completion of the access to the network resource.

14. The article of claim 13, further comprising:
de-installing the network layer access control entry following completion of the access to the network resource.

15. An apparatus comprising:
a first memory that stores executable instructions;
a first processor that executes the instructions from the first memory to:
determine a private network address for a user in connection with the user accessing a network resource on a network;
determine an application layer access control list entry for the user based on an access control policy;
generate a network layer access control list entry for the user based on the determine private network address;
send the determined application layer access control list entry to nodes on the network that do not support network layer packet filtering;
send the generated network layer access control list entry to nodes on the network that support network layer packet filtering;
translate a public network address to the private network address for the user accessing the network resource; and
allow or block the user access to the network resource based on at least one of the application layer access control list entry and the network layer access control list entry.

16. The apparatus of claim 15, wherein the generated network layer access control list entry comprises at least one of a destination address, a protocol layer designation, a source port, a destination port, the determined private network address, and an indication of allowed or denied access to the network resource.

17. The apparatus of claim 15, wherein determining the private network address comprises assigning a network address based on a dynamic host configuration protocol (DHCP).

18. The apparatus of claim 15, wherein the nodes on the network that support network layer packet filtering executes instructions to block or allow access to the network resource based on the network layer access control list entry.

* * * * *